United States Patent [19]

Seres et al.

[11] Patent Number: 4,835,105

[45] Date of Patent: May 30, 1989

[54] PROCESS FOR THE PREPARATION OF HIGH-PURITY GAMMA- AND ALPHA-CYCLODEXTRINS

[75] Inventors: Gábor Seres, Halásztelek; Miklós Járai, Budapest; Sándor Piukovich, Budapest; Mária Szigetvari née Gabányi, Budapest; József Szejtli, Budapest, all of Hungary

[73] Assignee: Chinoin Gyogyszer Es Vegyeszeti Termekek Gyara Rt., Budapest, Hungary

[21] Appl. No.: 71,577

[22] Filed: Jul. 9, 1987

Related U.S. Application Data

[63] Continuation of Ser. No. 684,904, Dec. 21, 1984, abandoned.

[30] Foreign Application Priority Data

Dec. 22, 1983 [HU] Hungary ................ 4406/83

[51] Int. Cl.$^4$ ............................................. C12P 19/18
[52] U.S. Cl. ...................................................... 435/97
[58] Field of Search ........................................... 435/97

[56] References Cited

U.S. PATENT DOCUMENTS

| | | | |
|---|---|---|---|
| 3,425,910 | 2/1969 | Armbruster et al. | 435/97 |
| 3,640,847 | 2/1972 | Armbruster et al. | 435/97 |
| 3,652,398 | 3/1972 | Armbruster et al. | 435/97 |
| 3,888,738 | 6/1975 | Okada et al. | 435/193 |
| 4,384,898 | 5/1983 | Okada et al. | 435/97 |
| 4,477,568 | 10/1984 | Hokse et al. | 435/97 |

FOREIGN PATENT DOCUMENTS

| | | | |
|---|---|---|---|
| 0045464 | 2/1982 | European Pat. Off. | 435/97 |
| 117997 | 9/1984 | European Pat. Off. | 435/97 |
| 3317064 | 11/1984 | Fed. Rep. of Germany | 435/97 |
| 156595 | 12/1980 | Japan . | |
| 28490 | 2/1984 | Japan | 435/97 |
| 0120998 | 6/1985 | Japan | 435/97 |

OTHER PUBLICATIONS

Kitahata et al, Purification and Some Properties of Cyclodextrin Glycosyl Transferase from a Strain of Bacillus Species, Agr. Biol. Chem., 38, 2, pp. 387–393 (1974).

*Primary Examiner*—Douglas W. Robinson
*Assistant Examiner*—Joseph A. Lipovsky
*Attorney, Agent, or Firm*—Herbert Dubno; Jonathan Myers

[57] ABSTRACT

The invention relates to a process for the preparation of high-purity gamma- and alpha-cyclodextrin starting from a starch substrate of low reducing capacity, partially hydrolysed with alpha-amylase. According to the invention a starch substrate of low reducing capacity partially hydrolysed with alpha-amylase is converted with cyclodextrin glucosyl transferase, after the addition of an aliphatic ketone of the formula $R_1COR_2$, in which $R_1$ and $R_2$ stand for a straight or branched chained alkyl group having from 1 to 6 carbon atoms, and/or a phenol derivative of the formula $R_3R_4PheOH$, wherein $R_3$ and $R_4$ are hydrogen, alkyl having from 1 to 4 carbon atoms, or $R_3$ and $R_4$ together form phenyl group, Phe stand for phenyl group, OH is hydroxyl and/or a benzene derivative of the formula $R_5R_6Phe$, wherein $R_5$ and $R_6$ are hydrogen, alkyl having from 1 to 4 carbon atoms, or $R_5$ and $R_6$ together form phenyl group, Phe is phenyl, as a precipitating agent, and if desired, alpha- and/or gamma-cyclodextrin is isolated from the conversion mixture in a crude form, or after further purification, in a pure form.

8 Claims, No Drawings

PROCESS FOR THE PREPARATION OF HIGH-PURITY GAMMA- AND ALPHA-CYCLODEXTRINS

This is a continuation of co-pending application Ser. No. 684,904 filed on Dec. 21, 1984 now abandoned.

SPECIFICATION

The invention relates to the preparation of highpurity gamma- and and alpha-cylodextrins.

It is known that cyclodextrins (Schardinger dextrins, cycloamyloses) are cyclic oligosaccharides consisting of 6 to 12 anhydroglucopyranose units connected with alph (1→4) bonds. Of these compounds the alph-, beta- and gamma-cyclodextrins (described below as CD-S) having a 6-, 7- and 8-member ring, respectively are the most important. Due to their caverned structure, cyclodextrins are capable of forming inclusion complexes. Since they can include and protect from undesired effects a large variety of various, structurally different molecules, the pharmaceutical and food industry is highly interested in the development of cyclodextrins.

Cyclodextrins as the decomposition products of starch are not toxic. They can be prepared from starch by a special alpha-glucane depolymerizing enzyme, cyclodextrin-glucosyl-transferase (below: CGT) (E.C. 24.1.19). This enzyme can generally be obtained from a submerged culture of Bacillus macerans, Bacillus polymixa, Bacillus stearothermophylus, Bacillus circulans, Klebsiella pneumoniae, alkalophilic Bacillus species N°=38-2, N°=17-1. The starch degrading property of CGT is essentially based on the transmission of the glucosyl group and is of nonhydrolytic character. The enzyme can utilize any substrate containing (1→4) glucane bonds, such as amylose, amylopectine, glycogen, etc. CGT produces a mixture of linear and cyclic oligosaccharides from these substrates, where the cyclic oligosaccharides are formed in a consecutive series of reactions. In the reaction mixture beta-cyclodextrin is present in the highest proportion.

The mutual proportion of the various cyclodextrin components can be adjusted by adding to the reaction mixture containing starch and CGT, reactants forming insoluble complexes. In this manner the reaction mixture will be enriched in the cyclodextrin component which forms the most stable complex with the complexing agent employed.

For example, it is known that a conversion mixture containing predominantly alpha-CD is obtained if aliphatic alcohols having 8 to 18 carbon atoms are added to the mixture. According to the Japanese Patent Specification No. 51-12941 the formation of alpha-cyclodextrin from a practically glucose-free starch hydrolysate having a reducing capacity of 0 to 2 dextrose equivalents (DE) is promoted by using 1-decanol and 1-nonanol as a precipitating agent. According to one of the working examples by using 1-decanol as a complexing agent at 45° C., in 48 hours 36 % of alpha-cyclodextrin can be obtained.

Another method for the preparation of conversion mixtures substantially containing alpha-cyclodextrin is disclosed in the U.S. Pat. No. 3,640,847. In this method the starting starch hydrolysate has a reducing capacity of at most 20 DE, and the precipitation is carried out with agents containing an aliphatic carbon chain having at least 8 carbon atoms, such as alcohols, e.g. 1-octanol, 1-nonanol, 1-decanol, 1-undecanol, 2-undecanol, 1-dodecanol, 9-decem-1-ol, 1-octadecanol; aldehydes, e.g. 1-decanal, 1-dodecanal; ketones, e.g. 2-decanone; fatty acids, e.g. 1-decanic acid; ethers, e.g. didecylether; esters, e.g. methyl octanoate, methyl decanoate, methyl dodecanoate; thioalcohols, e.g. 1-decanethiol; nitriles, e.g. 1-undecane nitrile; or organic halides, e.g. 1-decyl chloride, i.e. aliphatic carbon compounds containing sulfur or an atom with a higher electronegativity in their terminal group. According to a working example from a 30 % potato starch hydrolysate by conversion carried out at 55° C., in the presence of 1-decanol for 3 days, 65 % by weight of alpha-cyclodextrin is obtained related to the weight of the starch. There are numerous molecules known in the art which form soluble and insoluble inclusion complexes with alpha-CD. Thus, for examples the suitable guest molecules include halogenated benzene derivatives, benzene, diphenyl, cyclohexane, 4,4-dihydroxy-diphenyl, terphenyl, o-chlorophenyl, aniline, N-methylaniline, p-chloro-aniline, ethyl bromide, 1,6-dibromobutane, ethylchloroacetate, propionic acid, butyric acid, capric acid, dimethylglyoxime, elementary chlorine, bromine, iodine-potassium iodide, p-cymene, p-cymene, p-phenylene-diacroleine, hydroquinone, vinylethyl ether, o-chlorohydroquinone, 1,4-butandithiol, 1,6-hexandithiol, bis(10-mercaptodecamethylene) ether, carbondisulfide [Chem. Ber. 90, 2561 (1957)].

In the U.S. Pat. No. 3,541,077 an industrially applicable method is described for the production of alpha-CD starting from starch convert liquors, using as guest molecules, with which the alpha-cyclodextrin forms insoluble inclusion complexes, cyclohexane, tetrachloroethane, trichloroethylene, benzene, hexane, 1-octanol, toluene, carbon disulfide. Since the further purification of the conversion mixture obtained or of the intermediary product of manufacture is difficult, partially because of poor filterability due to the hydrophobic intramolecular adducts formed with the unconverted starch, partially because of the high boiling point of some of the precipitating agents, which makes difficult their elimination from the system by steam distillation, during the practical application of this method one has to face serious problems.

It is known that the following molecules form inclusion complexes with gamma-CD: chlorinated benzene derivatives, benzene, cycloalkanes, cyclohexanol, naphthalene, anthracene, 9,10-dichlorounthracene, diphenyl, terphenyl, aniline, N-methyl-aniline, N,N-dimethylaniline, ethyl bromide, 8-oxy-quinoline, o-chloro-phenol, iodine-potassium iodide, p-cymene, ephederine [Chem.Ber. 90, 2561 (1957)]. These guest molecules, however, have so far not been employed for the industrial production of gamma-CD in starch conversions. There is a method known in the art, developed by Japanese scientists for the isolation of the gamma-CD content of the crystallization mother liquor obtained during the manufacture of beta-CD (Horikoshi et al., Proceedings of 1st International Confernece of Cyclodextrins, Budapest, 1981, Reidel Publ. Col., 1982). The crystallization mother liquor of beta-CD production carried out with CGT of alkalophilic species N°=38-2 origin is treated with amyloglucosidase in order to decompose the linear dextrin content, the glucose formed in the reaction mixture is filtered off with a Daiaion FRK-01 ion exchange resin, the gamma-CD content is separated on a Toyo Pearl HW-40 gel filter column, and after evaporation and purification of the effluent gamma-CD is crystallized. Since gamma-CD is not the main product of this process, the gamma-CD yield is rather poor: it is about 20 kg/ton of the potato starch starting material.

Our intention was to provide a process by which optionally, either alpha-CD or gamma-CD can be prepared as a main component from the same starting material.

We have surprisingly found that the desired result can easily be obtained by a process which is based on the consecutive CD-formation, earlier elucidated by us. According to this reaction mechanism beta- and gammacyclodextrins are formed from the alpha-CD produced in the first step; more particularly, gamma-CD is obtained in the last phase of the reaction, when the overwhelming part of the enzyme has already been inactivated. It is easy to see that the quantity of alpha-CD formed as first in the consecutive reaction steps, limits the gamma-CD quantity, i.e. the gamma-CD production can favorably be influenced by increasing the initial velocity of alpha-CD production.

Since, as it is known, there is a great difference between the cave diameter of alpha- and gamma-CD-s, the alpha-CD precipitating agents form unstable complexes with gamma-CD, and in an excess of the precipitating agent gamma-CD is not formed at all, or its amount is negligible.

In our experiments we have found that if a mixture of alpha- and gamma-CD precipitating agents is added to the conversion mixture, the gamma-CD amount is increased in the reaction mixture. By a proper selection of the reaction conditions it can be achieved that the velocity of gamma-CD formation is substantially accelerated, i.e. the operation of CGT is optimized and the disproportionating effect is supressed as far as possible.

It has been found that for the production of the various cyclodextrins any starch with different amylose/amylopectine proportions, e.g. potato starch, corn starch, waxy corn starch, beta-amylase-free cereal starch, glycogene, etc. can be employed, if the reducing capacity of the partial hydrolysate obtained therefrom by limited hydrolysis does not exceed the DE=8 value (the DE value is determined according to the standard DIN 1263). The alpha-amylase used for the hydrolysis can be of any origin, for example can be originated from Bacillus subtilis, Bacillus polymixa, Bacillus licheniformis, Aspergillus niger, Aspergillus oryzae, etc. In case of the above partial hydrolysis it is ensured already in the initial reaction phase that no disproportion should take place in absence of glucosyl acceptor.

After elimination of gamma-CD from the reaction mixture a substantial amount of beta-CD is also formed in the remaining conversion mixture, provided that CGT has not been inactivated in the meantime.

In the process according to the invention a combination of the precipitating agents is used for the preparation of alpha- and gamma-CD, respectively. If the main target is the alpha-CD production, as selective alpha-CD precipitating agents lower aliphatic ketones are employed. If gamma-CD is to be prepared in a higher amount, in addition to the above-mentioned ketones alkyl-substituted or fused phenol derivatives are added to the system.

In a preferred embodiment of the process according to the invention the starting material is corn starch, subjected to partial hydrolysis. The partial degradation is carried out with alpha-amylase of Bacillus origin, in the presence of calcium ions, in a medium of pH 7, at 80° C., and when the reducing capacity of the hydrolysate becomes lower than 8 DE, the enzymatic hydrolysis is interrupted by inactivation by heat at 120° C., under overpressure of 1 bar. In this manner a starch hydrolysate containing about 10 to 40 % by weight of CD-s is obtained. The hydrolysate contains a mixture of various dextrins with relatively great chain-lengths, and is liable to a fast retrogradation. Since the retrograded products are less accessible with respect to the CGT effect, in order to eliminate retrogradation CGT should be added to the reaction mixture immediately after the inactivation of the alpha-amylase. The CGT enzyme is of Bacillus species origin, the CGT preferably used in the process according to the invention is produced by Bacillus species BM 10-68 (MNG 00154). Thereafter, to promote the initial rapid alpha- and gamma-CD formation a phenol derivative dissolved in an aliphatic lower ketone is added to the system. As a ketone for example acetone, diethyl ketone, methylethyl ketone, methylpropyl ketone, methylisobutyl ketone can be employed, while suitable phenol derivatives include 1-naphthol, 2-naphthol, alkyl-substituted phenol derivatives (xylenol isomer), e.g. 2,4-dimethylphenol, 2,6-dimethylphenol, etc.

If one of the above-mentioned aliphatic ketones is employed as a selective alpha-CD precipitating agent, at 50 to 70° C., in the presence of 2 to 15 % by vol. of precipitating agent within 24 hours the alpha-CD yield related to the starch substrate amounts to 25 to 40 %. If an aliphatic ketone is used as a precipitating agent, in the CGT catalyzed starch conversions an equilibrium is achieved within about 24 hours, and in the reaction mixture essentially alpha-CD and a small amount of beta-CD is formed. The equilibrium is independent of the enzyme concentration employed.

If a combined precipitating agent system is added to the reaction mixture, gamma-CD can be prepared with a high yield. For the formation of gamma-CD the following combinations of precipitating agents are the most suitable: a 1:1 mixture of methylethyl ketone and 2,4-dimethyl phenol, and methylethyl ketone and 1-naphthol, respectively. For example starting from a 35 % by weight corn starch hydrolysate, at 35° to 45° C., using a 1:1 mixture of methylethyl ketone and 1-naphthol as a combined precipitating agent in an amount of 10 % by vol., under the effect of CGT in 20–50 hours gamma-CD is obtained with a yield of about 35 %.

From the conversion mixture gamma-CD can be separated as follows: beta- and gamma-CD present in the reaction mixture as an insoluble complex are filtered off, the filter cake is extracted with warm methanol to eliminate the precipitating agent, whereupon the gamma-CD content is extracted selectively, with a warm, 66 % methanol/water mixture. The extract is deionized on a polymeric adsorbent (Amberlite XAD-2, XAD-4, Roehm and Haas Co. Philadelphia; Diaion HP-20, Mitsubishi Chem. Ind. Ltd. Tokyo) and on a strong anion-cation exchange resin (Varion AD and Varion KS or Amberlite IR 120 and IRA 410), and purified from the non-ionic impurities present in the precipitating agent and substrate. The effluent obtained is evaporated until a dry substance content of 20 %, and further purified with activated carbon. The decolored gamma-CD solution is evaporated up to a 50 % dry substance content, and gamma-CD is crystallized from the aqueous solution.

Alpha-CD is isolated from the conversion mixture as follows: Amyloglucosidase is added to the reaction mixture to hydrolyse the unreacted starch, whereupon the excess of precipitating agent is eliminated by steam distillation. The residual solution is concentrated to 1/5 of its original volume, cooled, whereupon cyclohexane is added and alpha-CD is crystallized, filtered and dried.

The invention is directed to the preparation of high purity gamma- and alpha-cyclodextrins from a starch substrate of low reducing capacity partially hydrolyzed with alpha-amylase, with cyclodextrin glucosyl transferase, which comprises converting the starch substrate of low reducing capacity partially hydrolyzed with alpha-amylase with cyclodextrin glucosyl transferase after the addition of an aliphatic ketone of the formula $R_1COR_2$, in which $R_1$ and $R_2$ stand for a straight or branched chain alkyl group having 1 to 6 carbon atoms, and/or a phenol derivative of the formula $R_3R_4PheOH$, wherein $R_3$ and $R_4$ are hydrogen, alkyl having 1 to 4 carbon atoms, or $R_3$ and $R_4$ together form a phenyl group, Phe stands for a phenyl group, OH is hydroxyl, and/or a benzene derivative of the formula $R_5R_6Phe$, wherein $R_5$ and $R_6$ are hydrogen, alkyl having 1 to 4 carbon atoms, or $R_5$ and $R_6$ together form a phenyl group, and Phe is phenyl as a precipitating agent. If desired the alpha- or gamma-cyclodextrin is isolated from the conversion mixture in crude form, or after further purification, in a pure form.

In our experiments the cyclodextrin content was determined by thin layer chromatography (Szejtli, J.: Cyclodextrins, Their Inclusion Complexes p. 53–54, Akademiai Kiado, Budapest, 1982). The CGT activity was measured on the basis of the method by Kitahata (Okada, Kitahata United States Patent Specification No. 3,888,738). The activity of liquefying alpha-amylase was measured according to Sandstedt et al. [Cereal Chem. 16, 712 (1939)].

The invention will now be elucidated in greater detail by the following non-limiting Examples.

EXAMPLE 1

Preparation of a conversion mixture essentially containing alpha-CD 170 g of corn starch are suspended in 340 g of tap water, the pH of the slurry obtained is adjusted to 5–6 with a 10 % by weight aqueous hydrochloric acid solution and subsequently to pH 7.1–7.4 with a 10 % by weight aqueous calcium hydroxide suspension. The mixture is then liquefied with alphaamylase (NOVO Industri A.S., Copenhagen, BAN 240 L) at 80° C. for 15 minutes. The enzyme is added in an amount of 2 SKB units/g of starch (SKB unit: amylase activity unit, Sanstedt, Kneen, Bergstrom: Cereal Chem. 29, 108, 1952). The excess of enzyme is then inactivated by heat treatment at 120° C. for 30 minutes. The reducing capacity of the hydrolysate obtained is 7.4 DE.

To carry out the conversion 3-ml portions of the hydrolysate are weighed into the 5-ml reaction tubes of a suitable block reactor (e.g. Pierce Chemical Comp. Rockfor, Reacti-Therm) at 45° C., whereupon CGT with a 24 Kitahata units/g starch activity /Kitahata unit: CGT activity unit, Kitahata, Tsuyama, Okada: Agr. Biol. Chem. 38, 387, 1974 (Bacillus species BM 10-68, MNG 000154) are added, and into the subsequent tubes 500 microliter of 1-octanol, 1-decanol, 1-octadecanol, methylethyl ketone (MEK), diethyl ketone ($Et_2CO$), methylpropyl ketone (MEPROK), methylisobutyl ketone (MIBUK), acetone and distilled watr, respectively is added. Conversions are performed at 45° C. under continuous stirring for 5 days. Daily samples ae taken from the reaction mixtures, and the conversion grade is monitored by determination of the various cyclodextrins by thin layer chromatography. The results are evaluated by semi-quantitative area comparative method and summarized in Table 1 below:

TABLE 1

| Precipitating agent | alpha-CD | | | | beta-CD | | | | gamma-CD | | | |
|---|---|---|---|---|---|---|---|---|---|---|---|---|
| | % [w/v] in the conversion mixture Days | | | | | | | | | | | |
| | 1 | 2 | 3 | 5 | 1 | 2 | 3 | 5 | 1 | 2 | 3 | 5 |
| 1-octanol | 6 | 8 | 5 | 1 | 3 | 7 | 7 | 4 | — | — | 1 | 1 |
| 1-decanol | 6 | 10 | 12 | 3 | 4 | 7 | 6 | 6 | — | 1 | 1 | — |
| 1-octadecanol | 8 | 7 | 5 | 2 | 2 | 2 | 4 | 2 | — | — | 1 | — |
| MEK | 8 | 7 | 7 | | 4 | 6 | 7 | | — | 2 | 2 | — |
| diethyl ketone | 8 | 8 | 7 | | 4 | 4 | 5 | | — | 2 | 4 | |
| MEPROK | 6 | 8 | 7 | | 2 | 3 | 3 | | — | 2 | 2 | |
| MIBUK | 5 | 3 | 4 | | 4 | 8 | 8 | | — | 1 | 1 | |
| acetone | 3 | 4 | 2 | | 3 | 3 | 2 | | — | 1 | 1 | |
| no precipitant | 3 | 2 | 2 | | 2 | 3 | 3 | | — | 1 | 1 | |

EXAMPLE 2

Preparation of a conversion mixture essentially containing gamma-CD

From a corn starch hydrolysate prepared as described in Example 1 3-ml portions are added into the reaction tubes of the block reactor according to Example 1, whereupon CGT is added in an amount of 24 Kitahata units/g starch t 45° C., and 500/ulit. portions of the following precipitating agents are added into the various tubes: 1:1 mixture (parts by volume) of methylethyl ketone (MEK) and toluene, diethyl ketone ($Et_2CO$) and toluene, methylisobutyl ketone (MIBUK) and toluene, MEK and xylene, $Et_2CO$ and xylene, MIBUK and xylene; 1:1 mixture (parts by weight) of MEK and 1-naphthol, MEK and 2,4-dimethylphenol (2,4-DMP); and toluene. The results of t.l.c. analysis of the samples taken daily are set forth in Table 2.

TABLE 2

| Precipitating agent | | alpha-CD | | | beta-CD | | | gamma-CD | | |
|---|---|---|---|---|---|---|---|---|---|---|
| | | % [w/v] in the conversion mixture Days | | | | | | | | |
| A | B | 1 | 2 | 3 | 1 | 2 | 3 | 1 | 2 | 3 |
| MEK | toluene | 3 | 2 | 1 | 4 | 10 | 16 | — | — | — |
| diethyl ketone | toluene | 4 | 7 | 4 | 5 | 8 | 15 | — | 1 | 2 |
| MIBUK | toluene | 3 | 1 | 1 | 3 | 10 | 17 | — | — | — |
| MEK | xylene | 5 | 5 | 3 | 6 | 10 | 14 | — | 2 | 1 |
| diethyl ketone | xylene | 5 | 4 | 3 | 5 | 9 | 10 | — | 3 | 3 |
| MIBUK | xylene | 3 | 2 | 1 | 8 | 12 | 18 | — | — | — |
| MEK | 1-naphthol | 4 | 3 | 1 | 6 | 11 | 15 | 7 | 13 | 10 |
| MEK | 2,4-DMP | 4 | 2 | 0 | 5 | 5 | 12 | 6 | 15 | 14 |
| — | toluene | 3 | 1 | 1 | 4 | 6 | 12 | — | — | — |

EXAMPLE 3

Preparation of a conversion mixture essentially containing gamma-CD

The corn starch hydrolysate prepared in Example 1 is subjected to conversion as described in Example 1. The reaction temperature is 40° C. and the precipitation is performed with 1:1 mixtures (weight raio) of the components "A" and "B" given in Table 3. The mixture are used in 500/ulit. portions. The conversion is continued for 2 days, and each day samples are taken. The results of the t.l.c. analysis of the various samples are shown in Table 3 below:

TABLE 3

| Precipitating agent | | % [w/v] in the conversion mixture Days | | | | | |
|---|---|---|---|---|---|---|---|
| | | alpha-CD | | beta-CD | | gamma-CD | |
| A | B | 1 | 2 | 1 | 2 | 1 | 2 |
| MEK | 2,4-DMP | 4 | 1 | 8 | 10 | 7 | 13 |
| | 2,6-DMP | 4 | 2 | 8 | 9 | 2 | 10 |
| | 1-naphthol | 6 | 1 | 9 | 8 | 5 | 14 |
| MEK | 2-naphthol | 6 | 4 | 6 | 8 | 7 | 9 |
| | naphthalene | 3 | 1 | 9 | 10 | 5 | 5 |
| | phenol | 1 | 1 | 2 | 3 | — | — |
| water | 2,4-DMP | 1 | — | 4 | 3 | 1 | 1 |
| water | 1-naphthol | 1 | — | 5 | 5 | 1 | 2 |

EXAMPLE 4

Preparation of crude alpha-CD

To 500 ml of the corn starch hydrolysate prepared in Example 1 50 Kitahata units/g starch of CGT are added at 45° C. under continuous stirring, followed by the addition of 50 ml of methylethyl ketone after 50 minutes. The reaction temperature is then increased to 55° C. and the conversion is continued for another 10 hours. The pH of the reaction mixture is adjusted to 4.3, whereupon 1 AGU/g starch (amyloglucosidase unit) of amyloglucosidase (NOVO Industri A.S. Copenhagen, AMG 150 L) are added to the mixture. The residual starch fraction of high molecular weight, which did not take part in the reaction, is hydrolysed at 55° C. within 16 hours. Thereafter, the excess of methylethyl ketone is eliminated by steam distillation under atmospheric pressure. The reaction mixture is then concentrated to 1/5 of its volume and cooled to 10° C. After adding 5 ml of cyclohexane the alpha-CD-cyclohexane complex is crystallized by shaking at 5° C. for 16 hours. The complex obtained is filtered off, dried in an desiccator to yield 34 g of a crude alpha-CD complex.

EXAMPLE 5

Preparation of crude gamma-CD

To 500 ml of the corn starch hydrolysate prepared in Example 1 25 Kitahata units/g starch of CGT are added at 45° C. under continuous stirring. After 50 minutes 50 ml of a 1:1 mixture (weight ratio) of methylethyl ketone and 1-naphthol are added (pH=5.5–6.5). The conversion is continued at the same temperature for 24 hours under continuous stirring. Thereafter the reaction mixture is filtered, the precipitate is dried to yield 120 g of crude gamma-CD complex.

EXAMPLE 6

Preparation of beta-CD complex

The filtered conversion mixture obtained by the process disclosed in Example 5 is allowed to stand for 2 days at 40° C., while the beta-CD(methyl-ethyl ketone)1-naphthol complex present in the filtrate falls out. The obtained crystalline slurry is filtered, the crystals are dried to yield 14 g of crude beta-CD complex.

EXAMPLE 7

Preparation of pure gamma-CD complex 50 g of the crude gamma-CD complex prepared according to Example 5 are suspended in 150 ml of tap water. The suspension is alkalized with 2 ml of a 40 % aqueous sodium hydroxide solution, whereupon the precipitating agent content is extracted with 160 ml of 1-butanol. Thereafter, the extract is further purified by ion exchange. One part of the aqueous phase is poured onto a 200-ml mixed bed Varion KS ($H^+$) and Varion AD ($OH^-$) ion exchange column (Nitrokemia Ipartelepek, Fuzfő) and then onto a 100-ml standing bed Diaion HP-20 column (Mitsubishi Chemical Ind. Ltd. Tokyo). The other part of the aqueous phase is passed through a mixed bed column filled with Amberlite IR 120 ($H^+$) and Amberlite IRA 400 ($OH^-$) ion exchange resin (Roehm and Haas, Philadelphia), and then an Amberlite XAD-4 column (100 ml, standing bed).

The naphthol content of the effluents was monitored by thin layer chromatography, the ion content and the virtual conductance by conductometry [Radelkis OK 102/1 conductometer].

The results are set forth in Table 4 below:

TABLE 4

| Substance | napthene content | virtual conductance [$\mu S$] |
|---|---|---|
| butanolic reffinate | +++ | 149,000 |
| Varion KS + AD effluent | + | 180 |
| Diaion HP-20 effluent | ± | 130 |
| Amberlite IR + IRA 400 effluent | ± | 115 |
| Amberlite XAD-4 effluent | — | 80 |

EXAMPLE 8

Purification of crude gamma-CD

Three 100-g portions of the crude gamma-CD prepared according to Example 5 are separately suspended in 200 ml of water each. To the first slurry 400 ml of methanol, to the second one 400 ml of ethanol, to the third one 400 ml of 2-propanol are added, whereupon the slurries are refluxed for 1 hour. The extracts are further purified by ion exchange, as described in Example 7.

The results of the analysis of the effluents are shown in Table 5.

TABLE 5

| Extraction mixture | Starting extract | | Varion KS + AD effluent | | Amberlite IRA 120 + effluent | | Amberlite XAD-4 effluent | |
|---|---|---|---|---|---|---|---|---|
| | naphthol content | gamma-CD | naphthol content | gamma-CD | naphthol content | gamma-CD | naphthol content | gamma-CD |
| methanol/water 2:1 | ++ | +++ | — | +++ | — | ++ | — | +++ |
| ethanol/water 2:1 | ++ | +++ | — | +++ | ± | ++ | — | +++ |
| 2-propanol/water 2:1 | +++ | ++ | + | ++ | + | + | — | ++ |

The comparative study of the efficiency of various ion exchange resins shows that, due to the its low naphthol-concentration, the methanol-containing gamma- CD extract, can be purified also by Varion ion-exchange systems.

EXAMPLE 9

Preparation of pure gamma-CD and beta-CD complex 50 g of the crude gamma-CD prepared according to Example 5 are refluxed with 250 ml of methanol for one hour, the extracted precipitate is filtered and reextracted in a mixture of 500 ml of methanol and 250 ml of tap water for one hour. The extract obtained is filtered, the filtrate is allowed to stand overnight, whereupon the precipitated beta-CD complex is separated by filtration. 26 g of the beta-CD complex are obtained.

The filtrate is then passed through a mixed-bed ion exchange column filled with 20 ml of a Varion KS (H=) and 20 ml of Varion AD (OH−) resin at a flow rate of 40 ml/hour. The effluent is passed through an adsorption column containing 20 ml of Amberlite XAD-4 resin, at the above flow rate. About 700 ml of an effluent are obtained. The effluent is then concentrated until a 25 % by weight dry substance content. Thereafter 4 g of activated carbon are added, the mixture is decolored for half an hour, filtered and the filtrate is concentrated by further evaporation up to a dry substance content of 55 to 60 % by weight. Gamma-CD is then crystallized. After filtration and drying 20.1 g of crystalline gamma-CD are obtained.

We claim:

1. A process for the preparation of a cyclodextrin mixture comprising beta-cyclodextrin and gamma-cyclodextrin, each in the form of a ternary complex, which comprises the steps of:
   (a) partially hydrolyzing starch with alpha-amylase of bacillus origin in the presence of calcium ions at a pH of 7 at 80° C. until the reducing capacity of the hydrolysate becomes less than 8 D.E.;
   (b) interrupting the enzymatic hydrolysis carried out in step (a) by inactivating the alpha-amylase by heating to 120° C., under an overpressure of 1 bar;
   (c) treating the partially hydrolyzed starch with cyclodextrin glucosyl transferase of bacillus origin, having an activity of about 24 to 50 kitahata units/g;
   (d) adding to the hydrolysate at 35 to 45° C. in an amount of about 10% by volume a precipitating mixture of equal proportions of methyl ethyl ketone and a phenolic compound selected from the group consisting of 1-naphthol and 2,4-dimethylphenol; and
   (e) allowing the hydrolysate and the precipitating mixture to react for a period of 1 to 3 days to facilitate consecutive formation of alpha-cyclodextrin, which then forms beta-cyclodextrin and gamma-cyclodextrin, the latter as an insoluble ternary complex and the former as a soluble ternary complex.

2. The process for the preparation of a cyclodextrin mixture defined in claim 1 which further comprises the following steps:
   (f) filtering the cyclodextrin mixture formed in step (e) to separate and recover a precipitate containing gamma-cyclodextrin ternary complex and a filtrate containing beta-cyclodextrin ternary complex; and
   (g) allowing the filtrate to stand for 2 days at 40° C. to precipitate the ternary complex containing beta-cyclodextrin.

3. The process for the preparation of a cyclodextrin mixture defined in claim 2 which further comprises the step of extracting the precipitate formed in step (f) with a lower alkanol to eliminate the precipitating agent and then selectively extracting gamma-cyclodextrin from the precipitate by extraction with a 50 to 70% aqueous solution of a lower alkanol, and purifying the extract by adsorption and ion exchange, and crystallizing gamma-cyclodextrin.

4. A process for the preparation of a cyclodextrin mixture comprising beta-cyclodextrin as the principal product in the form of a ternary complex, which comprises the steps of:
   (a) partially hydrolyzing starch with alpha-amylase of bacillus origin in the presence of calcium ions at a pH of 7 at 80° C. until the reducing capacity of the hydrolysate is less than 8 D.E.;
   (b) interrupting the enzymatic hydrolysis carried out in step (a by inactivating the alpha-amylase by heating to 120° C. under an overpressure of 1 bar;
   (c) treating the hydrolysate with cyclodextrin glucosyl transferase of bacillus origin having an activity of about 24 to 50 kitahata units/g;
   (d) adding to the hydrolysate at 35 to 45° C. in an amount of about 10% by volume a precipitating mixture of equal proportions of methyl ethyl ketone and toluene; and
   (e) allowing the hydrolysate and the precipitating mixture to react for a period of 1 to 3 days to facilitate consecutive formation of alpha-cyclodextrin, which then forms beta-cyclodextrin as a ternary complex.

5. A process for the preparation of a cyclodextrin mixture comprising beta-cyclodextrin and gamma-cyclodextrin, each in the form of a ternary complex, which comprises the steps of:
   (a) partially hydrolyzing starch with alpha-almylase of bacillus origin in the presence of calcium ions at a pH of 7 to 80° C. until the reducing capacity of the hydrolysate becomes less than 8 D.E.;
   (b) interrupting the enzymatic hydrolysis carried out in step (a) by inactivating the alpha-amylase by heating to 120° C., under an overpressure of 1 bar;
   (c) treating the partially hydrolyzed starch with cyclodextrin glucosyl transferase of bacillus origin, having an activity of about 24 to 50 kitahata units/g;
   (d) adding to the hydrolysate at 35 to 45° C. in an amount of about 10% by volume a precipitating mixture of equal proportions of a ketone of the Formula:

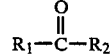

wherein $R_1$ and $R_2$ are each individually $C_1$ to $C_6$ straight or branched chain alkyl and an aromatic compound selected from the group consisting of 2,4-dimethylphenol, 2,6-dimethylphenol, 1-naphthol, 2-naphthol, and naphthalene; and
   (e) allowing the hydrolysate and the precipitating mixture to react for a period of 1 to 3 days to facilitate consecutive formation of alpha-cyclodextrin, beta-cyclodextrin, and gamma-cyclodextrin, the latter as an insoluble ternary complex and the former as a soluble ternary complex.

6. The process for the preparation of a cyclodextrin mixtue defined in claim 5 which further comprises the following steps:

(f) filtering the cyclodextrin mixture formed in step (e) to separate and recover a precipitate containing gamma-cyclodextrin ternary complex and a filtrate containing beta-cyclodextrin ternary complex; and
(g) allowing the filtrate to stand for 2 days at 40° C. to precipitate the ternary complex containing beta-cyclodextrin.

7. The process for the preparation of a cyclodextrin mixture defined in claim 6 which further comprises the step of extracting the precipitate formed in step (f) with a lower alkanol to eliminate the precipitating agent and then selectively extracting gamma-cyclodextrin from the precipitate by extraction with a 50 to 70% aqueous solution of a lower alkanol, and purifying the extract by adsorption and ion exchange, and crystallizing gamma-cyclodextrin.

8. A process for the preparation of a cyclodextrin mixture comprising beta-cyclodextrin as the principal product in the form of a ternary complex, which comprises the steps of:
(a) partially hydrolyzing starch with alpha-amylase of bacillus origin in the presence of calcium ions at a pH of 7 at 80° C. until the reducing capacity of the hydrolysate is less than 8 D.E.;
(b) interrupting the enzymatic hydrolysis carried out in step (a) by inactivating the alpha-amylase by heating to 120° C. under an overpressure of 1 bar;
(c) treating the hydrolysate with cyclodextrin glucosyl transferase of bacillus origin having an activity of about 24 to 50 kitahata units/g;
(d) adding to the hydrolysate at 35 to 45° C. in an amount of about 10% by volume a precipitating mixture of equal proportions of a ketone of the formula:

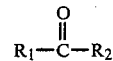

wherein $R_1$ and $R_2$ are each individually $C_1$ to $C_6$ straight or branched chain alkyl, and an aromatic hydrocarbon of the formula:

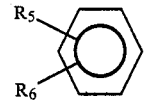

wherein $R_5$ and $R_6$ are each individually hydrogen or $C_1$ to $C_4$ alkyl; and
(e) allowing the hydrolysate and the precipitating mixture to react for a period of 1 to 3 days to facilitate consecutive formation of alpha-cyclodextrin, which then forms beta-cyclodextrin as a ternary complex.

* * * * *